United States Patent [19]

Tandon

[11] Patent Number: 4,986,836
[45] Date of Patent: Jan. 22, 1991

[54] FILTER SYSTEM TO REMOVE ENVIRONMENTALLY HARMFUL PRODUCTS

[75] Inventor: Jag S. Tandon, Northbrook, Ill.

[73] Assignee: American Environmental International, Inc., Northbrook, Ill.

[21] Appl. No.: 351,658

[22] Filed: May 15, 1989

[51] Int. Cl.$^5$ .............................................. B01D 53/04
[52] U.S. Cl. ........................................ 55/161; 55/180; 55/208; 55/270; 55/387
[58] Field of Search ................... 55/18, 20, 59, 62, 68, 55/74, 161, 179, 180, 208, 270, 387

[56] References Cited

U.S. PATENT DOCUMENTS

| | | | |
|---|---|---|---|
| 3,455,089 | 7/1969 | Mattia | 55/62 |
| 3,902,874 | 9/1975 | McAndrew | 55/74 |
| 4,021,211 | 5/1977 | Turek et al. | 55/18 |
| 4,047,904 | 9/1977 | Worrall | 55/18 |
| 4,190,423 | 2/1980 | Winter | 55/20 |
| 4,289,505 | 9/1981 | Hardison et al. | 55/59 |
| 4,414,003 | 11/1983 | Blaudszun | 55/18 |
| 4,565,553 | 1/1986 | Nowack | 55/59 |
| 4,689,054 | 8/1987 | Vara et al. | 55/62 X |
| 4,737,164 | 4/1988 | Sarkkinen | 55/59 X |
| 4,775,484 | 10/1988 | Schmidt et al. | 55/20 X |

Primary Examiner—Robert Spitzer
Attorney, Agent, or Firm—Wallenstein, Wagner & Hattis, Ltd.

[57] ABSTRACT

A system for the adsorption of volatile organic compounds from a contaminated gas stream. The system includes a filter for the removal of particulates from the stream, and a blower which draws the stream through the filter and transports it to a first granulated carbon filter which includes inner capillaries or passages for adsorbing substantially all of the volatile organic compounds from the contaminated gas stream. The resulting low-vapor stream is then discharged to the atmosphere through a stack. Control structure is provided for diverting the flow of the contaminated gas stream from the first carbon filter to a second carbon filter when an analyzer detects a concentration of volatile organic compounds above a given level in the low vapor stream. A regeneration device removes volatile organic compounds from the first carbon filter when the contaminated gas stream has been diverted to the second carbon filter.

6 Claims, 1 Drawing Sheet

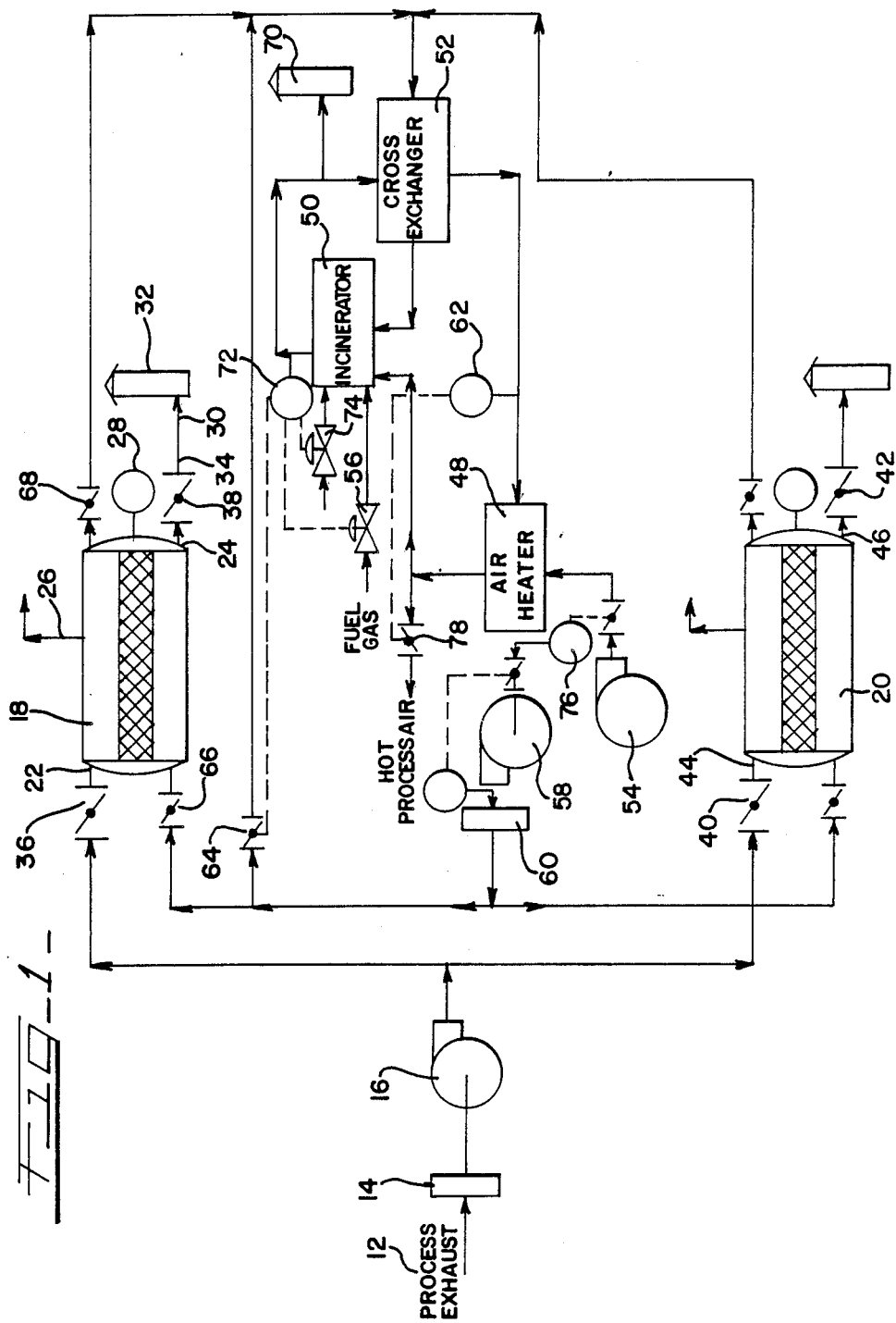

FILTER SYSTEM TO REMOVE ENVIRONMENTALLY HARMFUL PRODUCTS

TECHNICAL FIELD

The present invention relates to a system for the removal and incineration of volatile organic compounds from a gaseous stream.

BACKGROUND OF THE INVENTION

Since passage of the federal Clean Air Act in 1977, air quality standards have been adopted by a growing number of state and local governments. Many such standards limit the amount of volatile organic compounds that may be emitted. Such volatile organic compounds are present in process air used in coating operations, such as in paint spray booths, or printing operations.

Volatile organic compounds were once classified as organic chemical compounds having a vapor pressure in excess of 0.1 mm mercury at standard temperature and pressure (STP). With increasing concern over the deterioration of the protective ozone layer over broad segments of the planet, this definition is being expanded. Volatile organic compounds are increasingly being defined as all hydrocarbons that are photochemically reactive, regardless of the vapor pressure at STP.

There are two control technologies for reduction of volatile organic compounds. They are carbon adsorption and thermal incineration. Adsorption is suitable for applications where the process air has a relatively low solvent concentration. Thermal incineration, in contrast, is suitable for process air that has a relatively high solvent concentration.

SUMMARY OF THE INVENTION

The present invention is a hybrid system for the adsorption of volatile organic compounds from a saturated gaseous stream. It uses aspects of carbon adsorption and thermal incineration. It comprises a filter for the removal of particulates from the saturated gaseous stream. A blower draws the saturated gaseous stream through the filter, and thereafter transports the saturated gaseous stream at a proper design velocity to a first granulated carbon filter.

This first granulated activated carbon filter includes an inlet and an outlet. It receives the saturated gaseous stream at the inlet and under pressure from the blower.

The first activated carbon filter includes inner capillaries or passages for adsorbing substantially all of the volatile organic compounds from the saturated gaseous stream. In this manner, this saturated gaseous stream becomes a low-vapor gaseous stream which is substantially free of the volatile organic compounds when that low-vapor stream exits the first carbon filter at its outlet. This low-vapor stream is then discharged to the atmosphere through a stack.

An analyzer monitors the concentration of volatile organic compounds at or near the stack. Control means are provided for diverting the flow of the saturated gaseous stream from the first carbon filter to a second carbon filter when the analyzer detects volatile organic compounds at above a given level in the low vapor stream.

Finally, regeneration means are provided for removing volatile organic compounds from the first carbon filter when the saturated gaseous stream has been diverted to the second carbon filter.

BRIEF DESCRIPTION OF THE DRAWING

FIG. 1 is a schematic diagram of the system of the present invention, and including a first and a second granulated activated carbon filter.

DETAILED DESCRIPTION OF THE PREFERRED EMBODIMENT

Referring now to FIG. 1, the present invention is a system 10 for the adsorption of volatile organic compounds (hereinafter "VOCs") from a saturated gaseous stream. Typically, such a gaseous stream arises as a result of either coating operations, such as in paint spray booths, or printing operations.

In the context of the present invention, it should be understood that "saturated gaseous stream" is not intended to signify a gaseous stream which contains the maximum amount of VOCs that a gas can carry at a given temperature and pressure. Rather, it is intended to signify a gaseous stream that has a concentration of VOCs in excess of the upper limit permitted by law. In the context of the present invention, it shall be understood that the present embodiment is not limiting. In particular, the present preferred embodiment is directed to a system using two carbon filters 18 and 20. A system using only one such carbon filter 18 is fully contemplated and has been claimed.

The system uses charcoal filtration to remove the VOCs from the gaseous streams. Because charcoal filtration of VOCs is best effected when the saturated gaseous stream (process exhaust) 12 is free of particulates, that stream 12 is first passed through a suitable filter 14. A filter which has been found to provide adequate filtration of particulates from a saturated gaseous stream 12 is described in U.S. Pat. No. 4,662,899, issued to Jag S. Tandon on May 5, 1987, and entitled "Air Pollution Control System Method and Apparatus." This filter enables the removal of particulates having a diameter of 0.3 microns or more from the gaseous stream.

A blower 16 is provided for drawing the saturated gaseous stream 12 through the filter 14, and for thereafter transporting the saturated gaseous stream at a proper and suitable design velocity. Suitable blowers are centrifugal, air-handling, spark-proof blowers available from the New York Blower Company, Willowbrook, Ill., or Buffalo Forge Co., Buffalo, N. Y. The blowers should have a capacity of from 500 to 100,000 standard cubic feet per minute (SCFM), and should generate a pressure equivalent to 10 to 25 inches of water column.

FIG. 1 shows a first 18 and a second granulated, activated carbon filter 20. Referring now to the first granulated, activated carbon filter (hereinafter "first carbon filter" or "carbon filter"), the carbon filter 18 includes an inlet 22 and an outlet 24. Adjacent the inlet 22 and outlet 24 are dampers 36 and 38, whose purpose and function will be discussed below. In this embodiment, the first 18 and second carbon filters 20 are identical, and only one filter is used to remove VOCs from the saturated gaseous stream at any given time. Initially, the system will be described as the saturated gaseous stream is treated by the first carbon filter 18.

Blower 16 transports the saturated gaseous stream, under pressure, to the inlet 22 of carbon filter 18. The filter 18 may be obtained from American Environmental International, Northbrook, Ill. 60062, as the Printkleen traveling bed, high velocity/high efficiency filter.

The carbon suitable for use in the bed is available from Calgon as "BPL" granular carbon. This granular carbon includes inner capillaries or passages for adsorbing substantially all of the volatile organic compounds from the saturated gaseous stream. Other sources of suitable granular carbon include Barneby and Sutcliffe Corp., Columbus, Ohio.

The carbon filter 18 includes a pressure relief valve 26 and a high-temperature shut-off 28. The high-temperature shut-off 28 will help to prevent fires in the carbon filter 18. Such fires can occur in the bed of the carbon filter 18 in the event that the oxygen content of air being used to purge that filter exceeds 1.5%.

After the saturated gaseous stream has passed through the carbon filter 18, it is discharged through the outlet 24 of that filter. Upon discharge, the gaseous stream is largely free of the volatile organic compounds present in the saturated gaseous stream 12. Accordingly, for the purposes of the disclosure, this discharge will be referred to as a low-vapor gaseous stream 30. The low-vapor gaseous stream 30 is released to the atmosphere through a stack 32.

An analyzer 34 is provided to monitor the concentration of VOCs at the outlet 24, or at a point between the outlet 24 and the stack 32. Such analyzers are available from Beckman Industries or Foxboro Co., Foxboro, Mass. Typically, a threshold concentration which may not be exceeded is set by governmental authorities. This threshold may be 5% of the concentration of the saturated gaseous stream, or at an arbitrary concentration, such as 60 parts per million (ppm).

When this concentration is exceeded, the carbon in the carbon filter 18 has lost its effectiveness, and become saturated, i.e., has lost its ability to remove the VOCs from the saturated gaseous stream. If the saturated gaseous stream 12 were to continue to be routed to this filter 18, that stream would leave the stack 32 having VOCs at a level above the maximum permitted concentration. The saturated gaseous stream 12 must therefore be diverted to the second carbon filter 20. In addition and in the interim, the first carbon filter 18 must be regenerated.

The use of a sole carbon filter 18, on the other hand, may be permitted when a plant is not run continuously. For example, the sole carbon filter 18 may be used for adsorption during an eight-hour workday shift. During non-working hours, the filter 18 may be regenerated as described above.

The diversion of the saturated gaseous stream is effected by control means associated with the analyzer 34. When that analyzer detects that the VOCs in the vapor-free stream exceed a given concentration, it causes the closing of the control means. In this two carbon filter embodiment, these control means comprise dampers 36 and 38 adjacent the inlet 22 and outlet 24 of the first carbon filter 18. At the same time, the analyzer 34 effects the opening of a second set of control means or dampers 40 and 42 adjacent the inlet 44 and outlet 46 of the second carbon filter 20. The saturated gaseous stream 12 is now being treated by the second carbon filter 20.

After the dampers 36 and 38 to first carbon filter 18 have been closed, and the saturated gaseous stream 12 has been diverted from the first carbon filter 18 to the second carbon filter 20, first carbon filter 18 must be regenerated by removal of the VOCs from the granulated carbon within that filter. Regeneration means are thus provided for removing the volatile organic compounds.

In this embodiment, the regeneration means comprises apparatus for passing a hot flue gas through the first carbon filter to vaporize and entrain in the hot flue gas the volatile organic compounds adsorbed in the first carbon filter.

Referring again to FIG. 1, in this embodiment this apparatus comprises an air heater 48, an incinerator 50, a cross-exchanger 52, and various other components to be described. Air heater 48 and cross-exchanger 52 are typically constructed of stainless steel. In a system in accordance with the preferred embodiment of the present invention, such a heater and exchanger typically has a capacity of 3000 standard cubic feet per minute, and is suitable for gases at temperatures from 100° F. to 1500° F. Typically, such heaters or exchangers are available from the Exothermics Division of Ellipse Manufacturing, Toledo, Ohio, or Deschamps Manufacturing, East Hanover, N.J.

The incinerator is of a nozzle mixing type. Suitable incinerators are available from Maxon Corporation, Muncie, Ind.

The hot flue gas is formed by drawing ambient air with a blower 54 through air heater 48. During this initial stage, this ambient air is not heated in the air heater 48, but passes directly from the air heater 48 to the incinerator 50.

The incinerator 50 is initially fired with a small amount of fuel gas, such as natural gas, which is fed to the incinerator 50 through a valve 56. As the air leaves the top of the incinerator, it is typically at a temperature of as much as 1500° Fahrenheit.

This air is then circulated through the cross-exchanger 52, air heater 48, and blower 58, and filter 60. Filter 60 is identical to filter 14. Filter 60 is optional, and may or may not be necessary in a given application. Prior to the entry of the air into the air heater 48, an oxygen probe 62 detects the amount of oxygen in that air. Such probes are available from Fuji Electric Corporation, Lincoln Park, N.J., or the Instrument Division of Rospatch Corp., Santa Barbara, Calif. If the oxygen content exceeds 1.5%, then damper 64 in a recirculation loop remains open to divert that air back to the incinerator 50 through the cross-exchanger 52. At the incinerator 50, the air is heated again to a temperature as high as 1500° F.

The continued reheating in the incinerator breaks down the oxygen content of the air to its byproducts, carbon dioxide and water. If the oxygen content of this flue gas were to exceed 1.5%, and if that flue gas were to be diverted to the first carbon filter 18 for purging of the VOCs, the likelihood of fire in the carbon bed would increase.

As the flue gas is recirculated through its recirculation loop in the manner described above, it is used to heat the ambient air. For example, the flue gas passes from the damper 64 to the cross-exchanger 52. There, the flue gas warms ambient air introduced into the system by blower 54 after its initial pass through the incinerator 50.

After leaving the cross-exchanger 52, the flue gas enters the incinerator 50. The temperature of the flue gas upon entry to the incinerator 50 is sufficient to heat the air from the air heater 48. Thus, after steady-state operation in the recirculation loop is attained, a lower supply of fuel gas to the incinerator 50 may be required, and valve 56 may then be throttled.

When the oxygen content of the flue gas passing oxygen probe 62 has fallen below 1.5%, damper 64 is closed and dampers 66 and 68 open. The hot flue gas, which is preferably at a temperature of about 300°–450° Fahrenheit, depending on the type of VOCs being desorbed, passes into carbon filter 18 through damper 66. The flue gas moves in a countercurrent direction through the carbon within the carbon filter 18, i.e., from bottom to top. The VOCs within the carbon are adsorbed by flue gas and removed with that gas through damper 68.

From the damper 68, the VOC-laden flue gas is transported through the cross-exchanger 52 and into the incinerator 50. The hot flue gas has entrained therein volatile organic compounds after passing through the first carbon filter 18. The high VOC content of the flue gas is lowered in the incinerator 50, and the lowered-VOC content flue gas is vented to the atmosphere through stack 70.

It will be understood by those skilled in the art that the recirculation loop and the process described above may be used in an analogous manner for the removal of excess VOCs from the second carbon filter 20 when the second carbon filter 20 has been saturated, and upon regeneration of the first carbon filter 18.

Other features of the system shown in FIG. 1 include a temperature sensor/controller 72. Such controllers are available from Honeywell, Inc., Process Control Division, Ft. Washington, Pa. This controller 72 acts as a fire suppression system for the incinerator 50. When the temperature within the incinerator 50 exceeds a given level, the controller 72 opens valve 74 to admit cooling water into the incinerator. Temperatures in excess of 1500° F. are most likely to occur when VOC-laden flue gas from first carbon filter 18 has an excessive VOC content. An additional temperature sensor/controller 76 is provided at the discharge of air heater 48. As indicated above, fire hazards can increase if the oxygen content of the flue gas entering first carbon filter 18 should exceed 1.5%. Fire hazards also increase if the temperature of that flue gas should exceed 300°–450° F. To effect any necessary lowering of the temperature of the flue gas, temperature sensor/controller 76 may cause an increased flow of ambient air into the recirculation loop through blower 54.

During incineration, the ambient air being heated in the air heater 48 is not needed. Accordingly, a valve 78 is opened to allow that heated ambient air to be used for other purposes outside of the system of the present invention.

I claim:

1. A system for the adsorption of volatile organic compounds from a contaminated gas stream, comprising:
   a. a filter for the removal of particulates from said contaminated gas stream;
   b. a blower for drawing said contaminated gas stream through said filter, and for thereafter transporting said contaminated gas stream at a proper design velocity;
   c. a first granulated activated carbon filter having an inlet and an outlet, said first carbon filter receiving said contaminated gas stream at said inlet and under pressure from said blower;
   d. said first activated carbon filter including inner capillaries or passages for adsorbing substantially all of said volatile organic compounds from said contaminated gas stream, whereby said contaminated gas stream becomes a substantially vapor-free gaseous stream which is largely free of said volatile organic compounds when said low-vapor stream exits said first carbon filter at said outlet, and is discharged to the atmosphere through a stack;
   e. a continuous analyzer and recorder to monitor the concentration of volatile organic compounds at said stack;
   f. control means for diverting the flow of said contaminated gas stream from said first carbon filter to a second carbon filter when said analyzer detects volatile organic compounds at a given level in said low-vapor stream; and
   g. regeneration means for removing said volatile organic compounds from said first carbon filter by applying a hot, oxygen-deprived regeneration gaseous stream thereto when said contaminated gas stream has been diverted to said second carbon filter, said regeneration means including a source of ambient air, incinerator means for receiving said source of air to reduce the oxygen content thereof below a given level which will not cause a fire hazard in said filter, oxygen control sensing means for sensing the amount of oxygen in the output of said incinerator means, means for feeding the incinerated, heated air constituting said regeneration gaseous stream to said filter only when said sensing means senses that the oxygen content of said incinerated air is below said given level, and means for feeding the regeneration gaseous stream removed from the carbon filter being regenerated to said incinerator means for reducing the amount of organic contents in said stream prior to disposing of the same.

2. The system as set forth in claim 1, wherein said hot regeneration gaseous stream is at a temperature of about 300°–450° Fahrenheit.

3. A system for the adsorption of volatile organic compounds from a contaminated gas stream, comprising:
   a. a first granulated activated carbon filter having an inlet and an outlet, said first carbon filter receiving said contaminated gas stream at said inlet;
   b. said first activated carbon filter adsorbing substantially all of said volatile organic compounds from said contaminated gas stream, whereby said contaminated gas stream becomes a substantially low-vapor gaseous stream which is largely free of said volatile organic compounds when said low-vapor stream exits said first carbon filter at said outlet;
   c. an analyzer to monitor the concentration of volatile organic compounds at said outlet;
   d. control means for diverting the flow of said contaminated gas stream from said first carbon filter when said analyzer detects volatile organic compounds at a given level in said low-vapor stream; and
   e. regeneration means for removing said volatile organic compounds from said first carbon filter by applying a hot, oxygen-deprived regeneration gaseous stream thereto when said contaminated gas stream has been diverted from said first carbon filter, said regeneration means including a source of ambient air, incinerator means for receiving said source of air to reduce the oxygen content thereof to below a given level which will not cause a fire hazard in said carbon filter, oxygen control sensing means for sensing the amount of oxygen in the output of said incinerator means, and means for feeding the incinerated, heated air constituting said regeneration gaseous stream to said filter only when said sensing means senses that the oxygen content of said incinerated air is below said given level, and means for feeding the regeneration gaseous stream removed from the carbon filter being regenerated to said incinerator means for reducing the amount of organic contents in said stream prior to disposing of the same.

4. The system as set forth in claim 3, wherein said hot regeneration gaseous stream is at a temperature of about 300°–450° Fahrenheit.

5. The system as set forth in claim 1 or 3, further including means for feeding all the regeneration gaseous stream removed from the carbon filter being regenerated to said incinerator means for reducing the amount of organic contents in said stream, second sensor means for sensing the amount of organic contents of the gas stream incinerated in said incinerator means, and means responsive to the reduction of the organic contents of said stream below a given level which can be safely vented to the atmosphere for venting the incinerated gas stream to the atmosphere.

6. The system as set forth in claim 1 or 3 wherein said incinerator means reduces the oxygen content in said regeneration gaseous stream to less than approximately 1.5%.

* * * * *

UNITED STATES PATENT AND TRADEMARK OFFICE
CERTIFICATE OF CORRECTION

PATENT NO.   : 4,986,836
DATED        : January 22, 1991
INVENTOR(S)  : Jag S. Tandon It is certified that error appears in the above-identified patent and that said Letters Patent is hereby corrected as shown below:

Column 4, Line 67, delete "fuel" and insert --flue--.

Signed and Sealed this

Fourth Day of August, 1992

Attest:

DOUGLAS B. COMER

*Attesting Officer*              *Acting Commissioner of Patents and Trademarks*